United States Patent [19]

Brugel

[11] Patent Number: 4,704,448

[45] Date of Patent: Nov. 3, 1987

[54] COPOLYETHERKETONES

[75] Inventor: Edward G. Brugel, Wilmington, Del.

[73] Assignee: E. I. Du Pont de Nemours and Company, Wilmington, Del.

[21] Appl. No.: 802,028

[22] Filed: Nov. 25, 1985

[51] Int. Cl.[4] ............................................. C08G 8/02
[52] U.S. Cl. ................................... 528/125; 528/194; 528/180; 528/182
[58] Field of Search ................. 528/125, 194, 180, 182

[56] References Cited

U.S. PATENT DOCUMENTS

| | | | |
|---|---|---|---|
| 3,065,205 | 11/1962 | Bonner | 260/63 |
| 3,441,538 | 4/1969 | Marks | 260/49 |
| 3,442,857 | 5/1969 | Thornton | 260/47 |
| 3,516,966 | 6/1970 | Berr | 260/47 |
| 3,524,833 | 8/1970 | Darms | 260/47 |
| 3,637,592 | 1/1972 | Berr | 260/47 |
| 3,666,612 | 5/1972 | Angelo | 161/165 |
| 3,668,057 | 6/1972 | Agolini et al. | 161/165 |
| 3,674,627 | 7/1972 | Angelo | 161/175 |
| 3,767,620 | 10/1973 | Angelo et al. | 260/47 |
| 3,791,890 | 2/1974 | Gander et al. | 260/61 |

FOREIGN PATENT DOCUMENTS 163464 12/1985 European Pat. Off. .
2138433A 10/1984 United Kingdom .

OTHER PUBLICATIONS

PCT/US84/01535, published Apr. 11, 1985.

*Primary Examiner*—John Kight
*Assistant Examiner*—M. L. Moore

[57] ABSTRACT

Novel copolyetherketones derived from diphenyl ether and aromatic diacids or diacid halides are disclosed where the diphenyl ether is present in a molar excess relative to the diacid or diacid halide chlorides of about 2 to 8%.

16 Claims, No Drawings

COPOLYETHERKETONES

BACKGROUND OF THE INVENTION

This invention relates to novel copolyetherketone compositions of matter, to shaped articles and composite structures prepared from them and to blends of them with other polymers.

Copolymers of aromatic diacid chlorides with diphenyl ether are known in the art. (Such copolymers will be termed "copolyetherketones" in this application.) U.S. Patents 3,516,966 and 3,637,592, issued to Berr on June 23, 1970, and January 25, 1972, respectively, disclose copolyetherketones having the following repeating structural unit

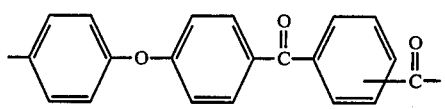

where the

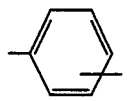

moiety is either

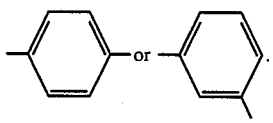

Both patents disclose that the copolyetherketones may be prepared by combining diphenyl ether and a mixture of terephthalyl and isophthalyl halide with a Friedel-Crafts catalyst such as boron trifluoride. Further process refinements, and the use of different catalysts, are described in U.S. Pat. No. 3,767,620, issued Oct. 23, 1973, and in U.S. Pat. No. 3,791,890, issued Feb. 12, 1974.

Most commercial applications for copolyetherketones require resins having high molecular weight. Thermoplastic processing applications, such as extrusion, injection molding, and film and sheet forming require a high degree of melt strength during the processing step, and melt strength increases with molecular weight. High molecular weight is also needed for fabrication by sintering processes where free forms are coalesced by heat treatment without pressure. Thus, the ability to increase and control the molecular weight of copolyetherketones is essential to their use. Heretofore, it has been difficult to attain copolyetherketones of high molecular weight.

In processes described in the art for preparing copolyetherketones, it has been standard to react substantially stoichiometric amounts of diphenyl ether and benzene dicarboxylic acid. Some examples (e.g., Examples 1, 2 and 3 in U.S. Pat. No. 3,516,966) illustrate the use of a 1% molar excess of diphenyl ether, but this is the greatest "excess" described in the art. This follows traditional thinking, of course, that a monomer ratio of 1.0 is preferred in condensation polymerizations for achievement of high molecular weight polymer. It stands to reason that, if one monomer is present in higher concentration than the other, the reaction will stop when it runs out of the lower concentration monomer, before high molecular weight has been achieved.

SUMMARY OF THE INVENTION

It has now surprisingly been found that by increasing the diphenyl ether concentration above that required for a stoichiometric polymerization of diphenyl ether and benzenedicarboxylic acid, novel, high molecular weight copolyetherketones can be obtained. Specifically, this invention relates to linear and branched copolyetherketones consisting essentially of diphenyl ether units and diacid units, wherein the diphenyl ether units are present in a molar excess relative to the diacid units of about 2 to 8%. Preferably, the molar excess of diphenyl ether units is in the range of about 2 to 6% and, more preferably, it is in the range of about 2.5 to 4.5%.

DESCRIPTION OF THE INVENTION

The copolyetherketones of this invention are prepared by known Friedel-Crafts synthesis as taught, for example, in U.S. Pat. Nos. 3,065,205 and 3,441,538. The most widely used catalysts are aluminum chloride with solvents such as nitrobenzene, chlorobenzene, o-dichlorobenzene, liquid hydrogen bromide, p-dichlorobenzene or methylene chloride; and boron trifluoride with solvents such as anhydrous hydrogen fluoride. It is preferred to contact the diphenyl ether with the "diacid" units in the acid chloride form, e.g. isophthalyl and/or terephthalyl chlorides, but other isophthalic and terephthalic halides, as well as free acids, are also operable.

There are a variety of methods for combining the reactants in the Friedel-Crafts synthesis. The preferred method involves contacting the diphenyl ether and the acid chloride in solvent and cooling to about 0°–5° C. Catalyst is added while the temperature of the reaction mixture is maintained at 0°–5° C. Following catalyst addition, the temperature of the reaction mixture is increased to about 100° C. as rapidly as possible (e.g., about 5°–10° C./minute). The reaction mixture is maintained at the elevated temperature for about thirty minutes, cooled to room temperature, and the copolyetherketone is recovered.

The diacid units in the copolyetherketones of this invention derive from aromatic diacid halides, preferably diacid chlorides, or their related free acids. The copolyetherketones are preferably derived from aromatic diacid halides or related diacids selected from isophthalic chloride and terephthalic chloride or mixtures of the two. The ratio of terephthalyl units to isophthalyl units in such mixtures is preferably in the range of 80:20 to 25:75, more preferably in the range of 70:30 to 30:70. Virtually any aromatic diacid halide or diacid may, however, be used to prepare the copolyetherketones of this invention, and examples of such electrophilic compounds can be found in U.S. Pat. No.3,441,538 (particularly at column 5, line 6 to column 6, line 47), the relevant disclosure of which is hereby incorporated by reference.

Small amounts of branching agents can be incorporated into the copolyetherketones of this invention as described in copending U.S. Ser. No. 802,027 filed simultaneously herewith (AD-5467). Such branching agents include m-diphenoxybenzene and compounds of the formula $(R(COX)_n$ and their related acids and anhydrides, where R is an aromatic moiety, X is halogen and n is an integer of 3 to 6. These branching agents are incorporated into the copolyetherketone in amounts equal to about (3/n) (0.25 to 33) mole % based on total moles of diphenyl ether and aromatic diacid or diacid halide, preferably about 0.5 to 1.5 mole %. When the branching agent is m-diphenoxybenzene, n is 3 and its quantity does not exceed about 2 mole %. Preferred branching agents are 1,3,5-benzene tricarboxylic acid and m-diphenoxybenzene.

It may also be possible to modify the structure of the copolyetherketones of this invention by adding small amounts (e.g., up to about 30 mole %) of other monomers which do not alter the overall characteristic of the polymer. Examples of such monomers include but are not limited to monoacylchlorides bearing a readily acetylatable position such as 3- or 4-phenoxybenzoyl-chloride, and materials such as bis(4-phenoxy)ben-zophenone, (4-phenoxyphenyl)benzoyl chloride or (4-phenoxybiphenyl)benzoyl chloride.

The novel copolyetherketones of this invention can be used in the form of shaped articles which can be prepared from the melt phase by extrusion, injection molding, compression molding or other convenient means. Standard sintering processes can also be used to produce useful shapes. Such shaped articles include but are not limited to films, magnetic and audio tape base, filaments, mechanical parts, electrical parts, circuit boards and the like. The copolyetherketones can also be used in the form of coatings. Using common coating techniques, coatings can be applied to wire, films, fabrics, etc.

The copolyetherketones of this invention can also be combined with fibrous substrates or particulate fillers using known methods to form composite structures. Fibrous substrates can include woven, nonwoven, tow, felt or undirectional continuous fibers. For many applications, such as various aerospace components, carbon fibers and aramid fibers, which produce light and strong composites, are the most preferred. Other fibers include, among others, glass, boron and asbestos fibers. Particulate fillers include but are not limited to carbon and graphite powders, mica, silica, clay and silicon carbide whiskers. The composite structures may optionally contain additives such as antioxidants, pigments, coupling agents for fillers, lubricants and anti-stick agents.

The copolyetherketones of this invention may be blended with other high performance polymers to prepare polymer blends useful for a number of purposes. Examples of polymers with which the copolyetherketones may be blended include, but are not limited to, the following:

(a) Polysulfones, such as those disclosed in U.S. Pat. No 3,795,660, G.B. No. 1,398,133, G.B. No. 1,109,842 and G.B. No. 1,016,245. Specific examples include that having the repeating unit

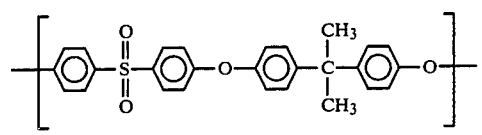

and sold under the tradename Udel by Union Carbide; or that having the repeating unit

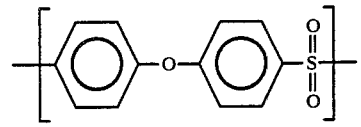

and sold under the tradename Victrex by Imperial Chemical Industries; or that having the repeating unit

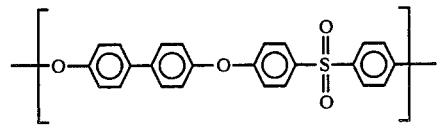

and sold under the tradename Radel by Union Carbide;

(b) Polysulfides, such as those disclosed in U.S. Pat. No. 3,870,687, a specific example being that having the repeating unit

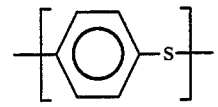

and sold under the tradename Ryton by Phillips Petroleum Company;

(c) Polyphenylene oxides, such as those disclosed in U.S. Pat. No. 3,639,508. An example is the reaction product of polystyrene and

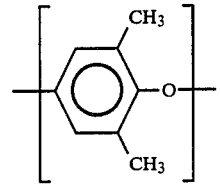

sold under the tradename Noryl by General Electric Company;

(d) Polyarylates, such as those prepared from an aromatic dicarboxylic acid and a bisphenol as disclosed in U.S. Pat. Nos. 3,216,970 and 4,126,602. Specific examples are those polyarylates prepared from Bisphenol A and isophthalic and/or terephthalic acid and sold under the tradenames Ardel by Union Carbide and Durel by Occidental Chemical;

(e) Polyetherimides, such as those disclosed in U.S. Pat. No. 3,833,546, a specific example being that having the repeating unit

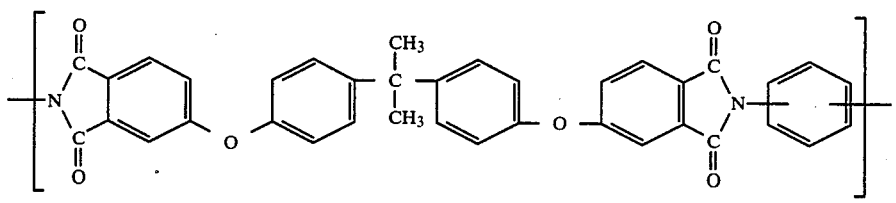

and sold under the tradename Ultem by General Electric Company; and those having the structures as taught in European Patent Application No. 84301679.1, published Oct. 17, 1984 (Publication No. 122060).

The blend may contain about 90 to 10% by weight of the copolyetherketone and, thus, about 10 to 90% by weight of one or more other polymers. Methods of blending polymers are known in the art and include film blending in a press, blending in a mixer (e.g. Haake mixer) and extruder blending.

The copolyetherketones of this invention are further illustrated by the following examples.

COMPARATIVE EXAMPLE A

A three-liter glass lined reactor was charged with 85.11 g (0.50 moles) diphenyl ether, 71.07 g (0.35 moles) terephthalyl chloride, 30.00 g (0.15 moles) isophthalyl chloride and 525 mol o-dichlorobenzene. The mixture was cooled to 0°–5° C. and 204 g (1.53 moles) of anhydrous aluminum chloride were slowly added while maintaining the temperature between 0°–5° C. Upon completion of the aluminum chloride addition, 1875 ml o-dichlorobenzene at 130° C. were added rapidly (less than 1 minute) to the reactor with vigorous stirring. The reaction was heated to 100° C. and held for thirty minutes. It was then cooled to room temperature and the o-dichlorobenzene solvent removed via a filter stick. Methanol (1200 ml) was added slowly with agitation and external cooling on the reactor to maintain the temperature below 50° C. The mixture was stirred for thirty minutes, filtered and washed twice with water. The polymer was steam distilled for one hour to remove residual o-dichlorobenzene and then soaked in formic acid for one hour. It was filtered and dried in a vacuum oven for eight hours at 180° C.

Comparative Example A was repeated except that different quantities of diphenyl ether were used and, in some examples, small amounts of benzene tricarboxylic acid were added as taught in copending U.S. Ser. No. 802,027, filed simultaneously herewith (AD-5467). The melt indexes measured for the polymers prepared in all the examples are presented in Table I.

TABLE I

| Example | DPE (moles) | TCL + ICL (moles) | BTAC (moles) | DPE (moles)/AC | M.I. |
|---|---|---|---|---|---|
| A | 0.50 | 0.50 | 0.0 | 1.00 | 558 |
| 1 | 0.508 | 0.502 | 0.0 | 1.01 | 338 |
| 2 | 0.515 | 0.50 | 0.0 | 1.03 | 112 |
| 3 | 0.517 | 0.50 | 0.0 | 1.035 | 197 |
| 4 | 0.525 | 0.50 | 0.0 | 1.050 | 306 |
| 5 | 0.535 | 0.50 | 0.0 | 1.070 | 410 |
| B | 0.510 | 0.50 | 0.0075 | 1.000 | 96 |
| 6 | 0.515 | 0.50 | 0.0050 | 1.015 | 38 |
| 7 | 0.530 | 0.50 | 0.0075 | 1.035 | 3 |
| 8 | 0.533 | 0.50 | 0.0066 | 1.045 | 21 |
| 9 | 0.538 | 0.50 | 0.0066 | 1.055 | 122 |
| 10 | 0.543 | 0.50 | 0.0066 | 1.065 | 157 |

TABLE I-continued

| Example | DPE (moles) | TCL + ICL (moles) | BTAC (moles) | DPE (moles)/AC | M.I. |
|---|---|---|---|---|---|
| 11 | 0.551 | 0.50 | 0.0066 | 1.080 | 400 |

DPE = diphenyl ether
TCL = terephthalyl chloride
ICL = isophthalyl chloride
BTAC = 1,3,5-benzenetricarboxylic acid
AC = acid chloride (TCL + ICL + BTAC)
M.I. = melt index measured by five minute preheat at 360° C., 8.4 kg load, to determine g/10 min.

These examples show that even a large excess (e.g. 8 mole %) of diphenyl ether does not destroy the polymerization. In fact, as the level of excess diphenyl ether is increased, the molecular weight goes through a maximum (minimum melt index). Even at 8 mole % excess diphenyl ether a molecular weight essentially equivalent to a 1.0 DPE/AC ratio is obtained.

What is claimed is:

1. A copolyetherketone consisting essentially of diphenyl ether units and aromatic diacid units, wherein the diphenyl ether units are present in a molar excess relative to the diacid units of 2 to 8%.

2. A copolyetherketone of claim 1 where the molar excess of diphenyl ether units to diacid units is in the range of 2 to 6%.

3. A copolyetherketone of claim 1 where the molar excess of diphenyl ether units to diacid units is in the range of 2.5 to 4.5%.

4. A copolyetherketone of claim 1, 2 or 3 where the aromatic diacid units are selected from terephthalyl units, isophthalyl units and mixtures thereof.

5. A copolyetherketone of claim 4 where terephthalyl units and isophthalyl units are present in a ratio in the range of 80:20 to 25:75.

6. A copolyetherketone of claim 5 where the terephthalyl units and isophthalyl units are present in a ratio in the range of 70:30 to 30:70.

7. A copolyetherketone of claim 1 which contains (3/n) (0.25 to 33) mole %, based on total moles of diphenyl ether and diacid, of one or more branching agents selected from the group consisting of m-diphenoxybenzene and compounds of the formula R—(COX)$_n$ and their related acids and anhydrides, where R is an aromatic moiety, X is a halogen, and n is an integer of from 3 to 6.

8. A copolyetherketone of claim 2 which contains (3n) (0.25 to 33) mole %, based on total moles of diphenyl ether and diacid, of one or more branching agents selected from the group consisting of m-diphenoxybenzene and compounds of the formula R—(COX)$_n$ and their related acids and anhydrides, where R is an aromatic moiety, X is a halogen, and n is an integer of from 3 to 6.

9. A copolyetherketone of claim 3 which contains (3/n) (0.25 to 33) mole %, based on total moles of diphenyl ether and diacid, of one or more branching agents selected from the group consisting of m- diphenoxybenzene and compounds of the formula R—(COX)$_n$ and their related acids and anhydrides, where R is an aromatic moiety, X is a halogen, and n is an integer of from 3 to 6.

10. A copolyetherketone of claim 4 which contains (3/n) (0.25 to 33) mole %, based on total moles of diphenyl ether and diacid, of one or more branching agents selected from the group consisting of m-diphenoxybenzene and compounds of the formula R—(COX)$_n$ and their related acids and anhydrides, where R is an aromatic moiety, X is a halogen, and n is an integer of from 3 to 6.

11. A copolyetherketone of any of claims 7, 8, 9 or 10 where the branching agent is m-diphenoxybenzene or benzene tricarboxylic acid chloride.

12. A shaped article obtained by extruding, compression molding or injection molding a copolyetherketone of any of claims 1, 2, 3, 7 or 10.

13. A shaped article obtained by extruding, compression molding or injection molding a copolyetherketone of claim 4.

14. A composite structure consisting essentially of (a) a copolyetherketone of any of claims 1, 2, 3, 7 or 10 and (b) either a fibrous substrate or a particulate filler.

15. A composite structure consisting essentially of (a) a copolyetherketone of any of claim 4 and (b) either a fibrous substrate or a particulate filler.

16. A blend of (a) 90 to 10% by weight of a copolyetherketone of any of claims 1, 2, 3, 7 or 10 and (b) 10 to 90% by weight of one or more polymers selected from polysulfones, polysulfides, polyphenylene oxides, polyarylates, and polyetherimides.

* * * * *